(12) United States Patent
Zhu et al.

(10) Patent No.: US 11,785,430 B2
(45) Date of Patent: Oct. 10, 2023

(54) SYSTEM AND METHOD FOR REAL-TIME INDOOR NAVIGATION

(71) Applicant: Research Foundation of the City University of New York, New York, NY (US)

(72) Inventors: Zhigang Zhu, Princeton, NY (US); Jin Chen, New York, NY (US); Hao Tang, New York, NY (US); Arber Ruci, Ridgewood, NY (US)

(73) Assignee: Research Foundation of the City University of New York, New York, NY (US)

( * ) Notice: Subject to any disclaimer, the term of this patent is extended or adjusted under 35 U.S.C. 154(b) by 258 days.

(21) Appl. No.: 17/399,457

(22) Filed: Aug. 11, 2021

(65) Prior Publication Data

US 2022/0329988 A1   Oct. 13, 2022

Related U.S. Application Data

(60) Provisional application No. 63/174,067, filed on Apr. 13, 2021.

(51) Int. Cl.
*H04W 4/33* (2018.01)
*H04W 4/029* (2018.01)
*G01C 21/20* (2006.01)
*H04W 4/80* (2018.01)

(52) U.S. Cl.
CPC ............ *H04W 4/33* (2018.02); *G01C 21/206* (2013.01); *H04W 4/029* (2018.02); *H04W 4/80* (2018.02)

(58) Field of Classification Search
CPC ......... H04W 4/33; H04W 4/029; H04W 4/80; G01C 21/206
See application file for complete search history.

(56) References Cited

U.S. PATENT DOCUMENTS

| | | | |
|---|---|---|---|
| 6,950,746 B2 | 9/2005 | Yano et al. | |
| 8,866,673 B2 | 10/2014 | Mendelson | |
| 8,896,485 B2 | 11/2014 | Mendelson | |
| 8,941,485 B1 | 1/2015 | Mendelson | |

(Continued)

FOREIGN PATENT DOCUMENTS

| AU | 2018101103 | 9/2018 |
|---|---|---|
| CN | 104284419 | 1/2015 |

(Continued)

OTHER PUBLICATIONS

World Health Organization; World Report on Vision; 2019; 180 Pages.

(Continued)

*Primary Examiner* — Steven S Kelley
(74) *Attorney, Agent, or Firm* — Peter J. Mikesell; Schmeiser, Olsen & Watts, LLP

(57) ABSTRACT

An indoor navigation system comprises a modeling subsystem that processes multimodal data regarding a location, individually generates a model of each of a plurality of overlapping local regions subdivided from the location, and maps the model of each region and a coordinate system of the model aligned with a floor plan of the location, and a navigation subsystem that processes the model to plot a path at the location for navigating a user along the path in real-time.

18 Claims, 13 Drawing Sheets

(56) References Cited

U.S. PATENT DOCUMENTS

| | | |
|---|---|---|
| 9,204,251 B1 | 12/2015 | Mendelson |
| 9,204,257 B1 | 12/2015 | Mendelson |
| 9,500,738 B2 | 11/2016 | Edge et al. |
| 9,539,164 B2 | 1/2017 | Sander et al. |
| 10,486,059 B1 | 11/2019 | Golden et al. |
| 10,659,921 B2* | 5/2020 | Venkatraman ...... G01S 5/02526 |
| 10,694,324 B2* | 6/2020 | Wang .................... H04W 4/021 |
| 11,032,705 B2* | 6/2021 | Manikantan Shila ...................... H04W 12/08 |
| 11,445,354 B1* | 9/2022 | Brosowsky ............. H04W 4/90 |
| 11,510,029 B2* | 11/2022 | Lacoche ................ H04W 4/024 |
| 2015/0185022 A1* | 7/2015 | Yoo ........................ H04W 4/024 701/408 |
| 2015/0312774 A1* | 10/2015 | Lau .......................... G05D 1/102 455/446 |
| 2017/0122745 A1* | 5/2017 | Kim .................... G01C 21/3638 |
| 2017/0171719 A1* | 6/2017 | Igarashi ................ H04W 4/043 |
| 2017/0336210 A1* | 11/2017 | Rahman ................. H04W 4/33 |
| 2020/0008022 A1* | 1/2020 | Krome .................... H04W 4/33 |
| 2020/0142388 A1* | 5/2020 | Maggiore ............... H04W 4/33 |
| 2020/0340815 A1 | 10/2020 | Frish et al. |
| 2020/0379425 A1* | 12/2020 | Ambühl ................. G06F 1/163 |
| 2021/0019953 A1* | 1/2021 | Pekelny .................... G06T 7/32 |
| 2022/0018661 A1* | 1/2022 | Liu ....................... G01C 21/206 |
| 2022/0124456 A1* | 4/2022 | Nurminen ........... G01S 5/02522 |
| 2022/0329988 A1* | 10/2022 | Zhu ....................... G01C 21/206 |

FOREIGN PATENT DOCUMENTS

| | | |
|---|---|---|
| CN | 112146656 | 12/2020 |
| EP | 3165939 | 5/2020 |
| KR | 102009031 | 8/2019 |

OTHER PUBLICATIONS

Apple; ARKit | Apple Developer Documentation; Jan. 5, 2017; https://developer.apple.com/documentation/arkit; 4 Pages.

World Health Organization; Global Data on Visual Impairments 2010; 2012; 17 Pages.

Chang, Y.; Multimodal Data Integration for Real-Time Indoor Navigation Using a Smartphone; CUNY Academic Works; May 2020; 59 Pages.

Dilek, U. et al.; Detecting position using ARKit II: generating position-time graphs in real-time and further information on limitations of ARKit; Phys Educ.; May 2018; vol. 53; 6 Pages.

Apple; InMapz indoor navigation maps; where.place.inc.; App Store Preview; Mar. 21, 2020; https://apps.apple.com/us/app/inmapz-indoor-navigation-maps/id1064844439; 3 pages.

\* cited by examiner

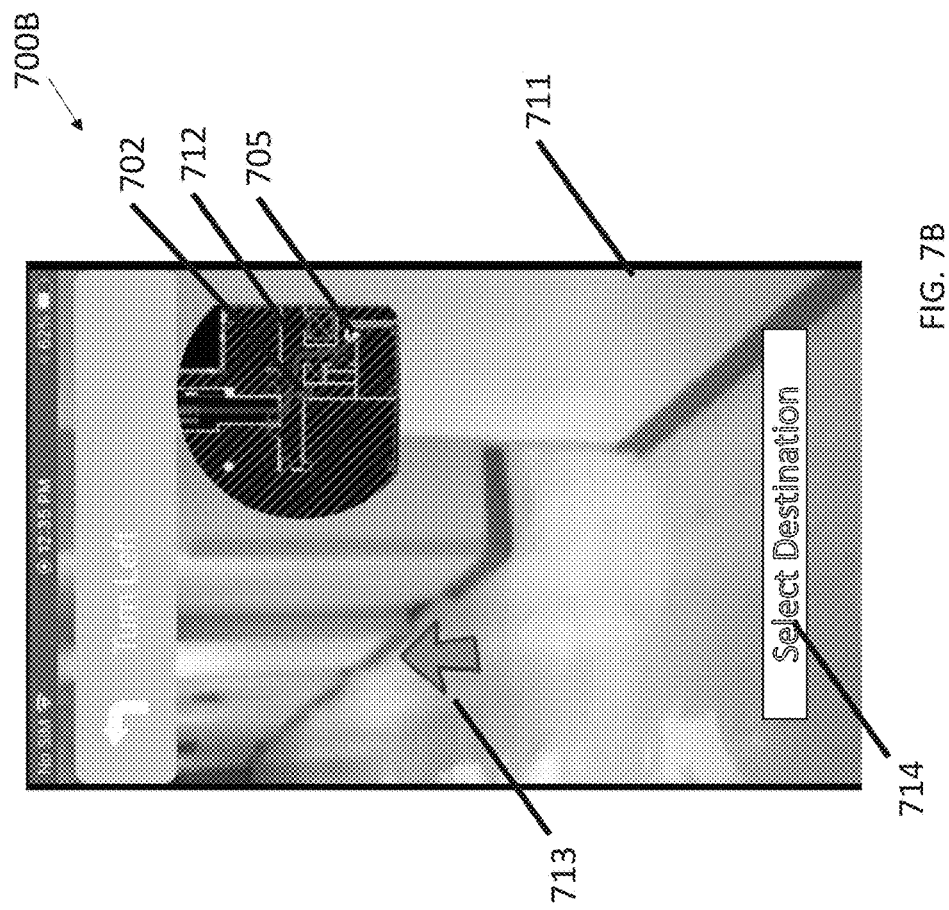
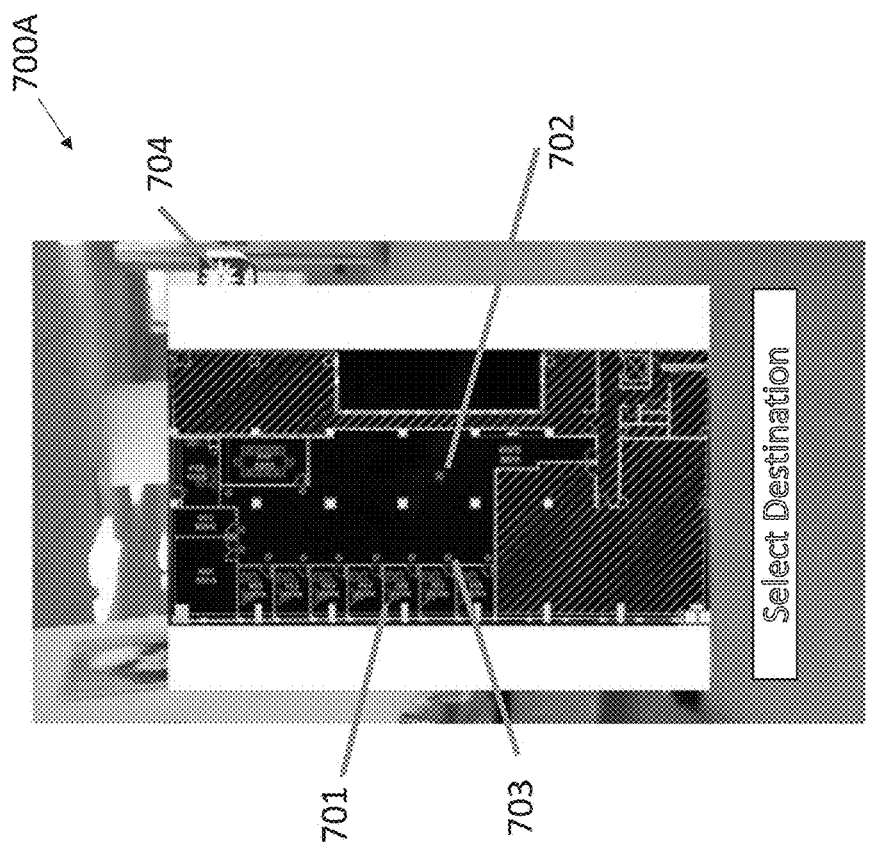
FIG. 7A
FIG. 7B

SYSTEM AND METHOD FOR REAL-TIME INDOOR NAVIGATION

RELATED APPLICATIONS

This application claims priority to U.S. Provisional Application Ser. No. 63/174,067, filed on Apr. 13, 2021 entitled "ASSIST: METHOD FOR MULTIMODAL ASSISTIVE INDOOR NAVIGATION," the entirety of which is incorporated by reference herein.

STATEMENT REGARDING FEDERALLY FUNDED RESEARCH OR DEVELOPMENT

This invention was made with government support under grant numbers 1827505 and 1737533 awarded by the National Science Foundation. The government has certain rights in the invention.

FIELD

The present concepts related generally to real-time navigation technology, and in particular, indoor localization of mobile electronic device users, especially users with special needs.

BACKGROUND

According to data from the World Health Organization (WHO) in 2019, there are at least 2.2 billion people, more than a quarter of the world population, suffering from various degrees of visual impairment or blindness. Among those people, according to WHO's World Health Report published earlier, there were 285 million people with low vision worldwide and 39 million people were suffering from blindness. For these people, hereafter referred as blind or visually impaired (BVI), as vision deteriorates, they often rely on a cane or a guide dog to find their way. Although these aids are helpful, they still face major challenges in wayfinding and navigation, especially in an unfamiliar indoor environment. The demand for a reliable indoor navigation application using only mobile devices has increased over recent years.

Many existing mobile applications rely on Wi-Fi for localization, which often has inconsistent results due to instability of Wi-Fi signals. Some applications also use Bluetooth Low Energy (BLE) beacons and unique marks (e.g., QR codes) around the facility, requiring expensive pre-installation and maintenance and having limited accuracy in localization. In addition to the cost, applications using computer vision often introduce large cumulative error for navigation over longer distances. Importantly, most of the indoor navigation applications target sighted users or mobile robots exclusively. That is, BVI users lack access to the necessary application functionalities for traveling safely inside the building.

SUMMARY

In one aspect, provided is an indoor navigation system, comprising: a modeling subsystem that processes multimodal data regarding a location, individually generates a model of each of a plurality of overlapping local regions subdivided from the location, and maps the model of each region and a coordinate system of the model aligned with a floor plan of the location; and a navigation subsystem that processes the model to plot a path at the location for navigating a user along the path in real-time.

In another aspect, provided is a system for modeling a building and navigating a user using a multimodal interface on a smart device, comprising a modeling subsystem that constructs a hybrid model of a location, the hybrid model comprising (1) a floor plan for each floor in the location, (2) at least one landmark at the location, and (3) Wi-Fi/cellular signal strengths throughout the location, wherein the floor plan for each floor is subdivided into at least a first region and a second region with an overlapping region that covers a portion of both the first region and the second region; an online management system that receives and saves the hybrid model; and a computer application stored and executed on a smart device that downloads the hybrid model from the web server to a smart device and plots a path from a starting location to the destination using the hybrid model for guiding the user of the smart device to the destination in real-time.

In another aspect, provided is an integrated method for modeling a building and navigating a user using a multimodal interface on a smart device, the method comprising: constructing a hybrid model of a location, the hybrid model comprising (1) a floor plan for each floor in the location, (2) at least one landmark at the location, and (3) Wi-Fi/cellular signal strengths throughout the location, wherein the floor plan for each floor is subdivided into at least a first region and a second region with an overlapping region that covers a portion of both the first region and the second region; uploading the hybrid model to a web service; downloading the hybrid model from the web service to a smart device; selecting a destination from the at least one landmark of the hybrid model; determining a starting location of the smart device; plotting a path from the starting location to the destination using the hybrid model; and guiding the user of the smart device to the destination in real-time.

In another aspect, provided is an integrated method for modeling a building and navigating a human user using a multimodal interface on a smart device, the method comprising: constructing a hybrid model of a location, the hybrid model comprising (1) a floor plan for each floor in the location, (2) at least one landmark at the location, and (3) Wi-Fi/cellular signal strengths throughout the location, wherein the floor plan for each floor is subdivided into at least a first region and a second region with an overlapping region that covers a portion of both the first region and the second region; uploading the hybrid model to a web service; downloading the hybrid model from the web service to a smart device, and wherein navigating the user comprises selecting a destination from the at least one landmark of the hybrid model; determining a starting location of the smart device; plotting a path from the starting location to the destination using the hybrid model, and guiding the human user of the smart device to the destination in real-time.

One or more of the following embodiments may include: the guiding comprises providing visual feedback and audio feedback to the human user, the guiding comprises providing tactile feedback to the human user, the location consists of a single beacon for each region, the path is plotted using real-time location accessibility data, the path is plotted using user preference data that is specific to the human user, the path is plotted using multimodal information.

In another aspect, provided is an online management system stored and executed on a web server comprising: a web application comprising (1) a database of the real-time building service status with pre-defined landmarks, (2) a database of the real-time user's location in the building and user's reported issues, (3) a database of a global map of the building and multimodal information of each region, (4) real-time communication with multiple databases, and (5) integrating with building database or API servers if existed; a building with at least one beacon in each region; and smart devices that are carried through the building, the smart devices being in real-time communication with the web application.

In another aspect, provided is a method for building a hybrid model of a location (e.g. a building), the method comprising steps of: dividing a 2D floor plan of the location into overlapping regions; installing or registering a BLE beacon for each region; traversing, by a human user, a first traversable path (such as a hallway) in a region of the building along a first distance while the human user carries a smart device, the smart device sensing the first distance and orientation and build a 3D region model; stopping at a certain destination (such as the door to a room, an elevator car, or a stairway); identifying the landmark by the human user on the 2D floor plan while the smart device sensing the 3D location of the same landmark in its current region model; collecting path information automatically at every time period (e.g. every second) by the smart device, the path information comprising (1) 3D location of intermediate landmarks and (2) Wi-Fi/cellular data connectivity of the intermediate landmarks; determine essential landmarks from all collected landmarks using the "essential" landmarks extraction algorithm; aligning the 3D model with the 2D floor plan using the piecewise alignment method; and saving the 3D region model as soon as the human user confirming finish modeling the region, to the online management system.

One or more of the following embodiments may include: the "essential" landmarks extraction algorithm comprising steps of identifying the essential landmarks (e.g., turning landmarks, user-identify landmarks); removing the unessential landmarks; adding intermediate landmarks between essential landmarks that with a distance greater than distance threshold; checking and replacing the redundant landmarks (i.e., closely located landmarks); and adjusting the connections between the result landmarks.

The piecewise alignment method may comprise steps of dividing the graph into triangles (with at least three essential landmarks) using the user-identified landmarks and Delaunay triangulation method; estimating the mapping matrix between the 2D floor plan and the 3D region model for each triangle area; obtaining the automatically collected essential landmarks' 2D floor plan locations using the estimated mapping matrix of the corresponding triangle; and connecting the landmarks in the local region graphs into a global graph of the building.

In another aspect, provided is a real-time localization and navigation method using the online management system, the method comprising steps of localizing a human user in a region using the Bluetooth beacon information; downloading the 3D region model of the current region; searching and selecting the destination by a human user; identifying the user-preferences for the route by a human user; searching the user's accurate 3D pose (location and orientation) in the current region model by matching the camera views with the 3D model; calculating the user's actual location and orientation in the floor plan using the piecewise alignment mapping matrices; planning a traversable path using a personalized path planning method; scheduling the download tasks for the 3D region models of the regions in the path and neighborhood regions by analyzing the Wi-Fi/cellular data connectivity information from the online management system; updating the user's pose through tracking and matching by the smart device during navigation; transiting to a new region model when the human user enters the overlapping area between region; using the model transition method to estimate the user's pose before the correspondence between the new region model and the real-world is established; and tracking the user's path and if the user goes off track reminding the user to come back to the path or update the route.

One or more of the following embodiments may include the personalized path planning method comprises steps of obtaining the real-time location service status from the building status real-time database; determining the user preference modifiers value based on the given user preferences; finding the nearest landmark to the current location; connecting the current location to the nearest landmark; searching the path between the current location to the destination using the modified Dijkstra's algorithm with equation (2) and equation (3).

The local model transition method may comprise calculating the average of the moving distance of the last few frames and extrapolating the user's motion linearly to estimate the user's current location if is delays in loading the new model; utilizing the previous region model camera pose and model-to-world transformation matrix with the tracking function of the smart device to estimate the user's pose before the match of the camera views to the new region model is established; and refining the user's pose as soon as the match of the camera views to the new region model is established.

BRIEF DESCRIPTION OF THE DRAWINGS

FIGS. 7A-7C are screenshots of a graphical user interface of a user electronic device illustrating an operation performed during real-time navigation, in accordance with some embodiments.

DETAILED DESCRIPTION

Figure 1:
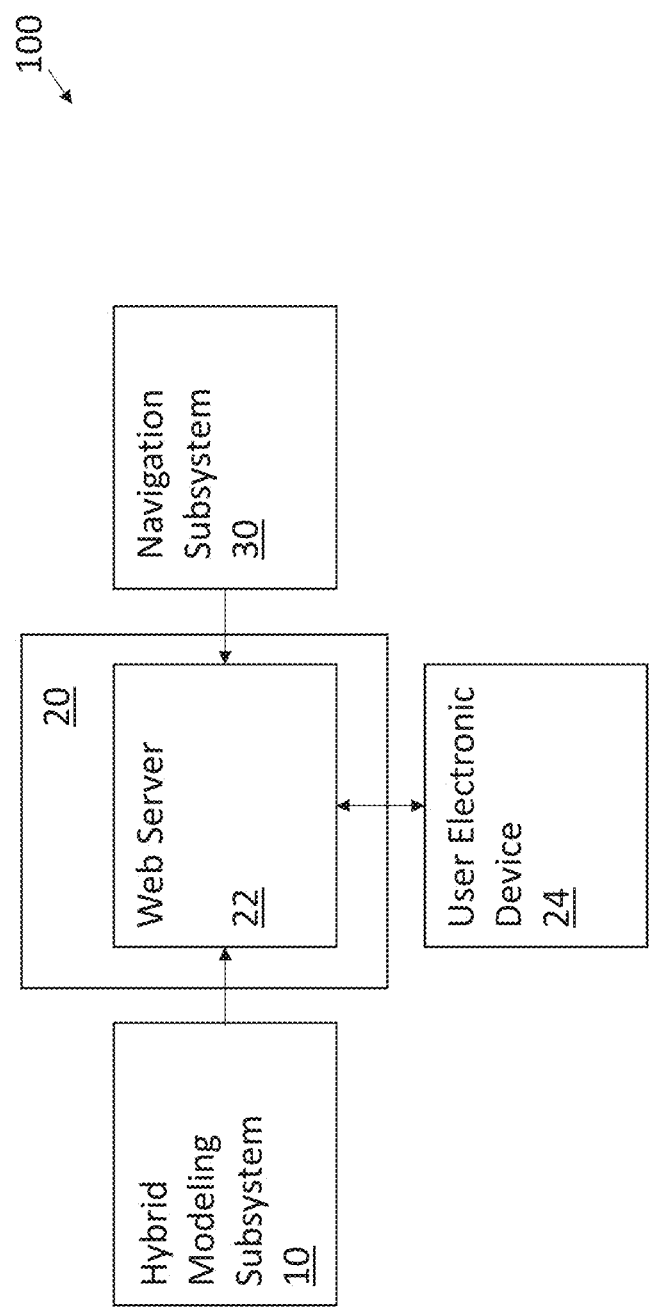
FIG. 1 is a block diagram of a real-time indoor navigation system, in accordance with embodiments of the present inventive concepts.

Conventional indoor navigation systems can allow a smartphone user to navigate inside a building. For example, Apple Computer, Inc. offers an augmented reality (AR) platform for iOS devices, referred to as ARKit, which applies a Visual-Inertial Odometry (VIO) technique to track the world around Apple's mobile devices, such as the iPad or iPhone. ARKit can detect notable feature points in the scene image seen by an iOS device's camera, and the device can determine its current movement by comparing the movement of these feature points across the video frames with data from the device's motion-sensing hardware, for example, following the movement of feature points and applying onboard motion detection technology to estimate their position in three-dimensional (3D) space. However, ARKit has a size limitation with respect to its working model. For a large region, it is difficult to store all the information in a single model. If the model is too large, it can significantly impact localization performance. In addition, the cumulative drift error will be increased with long-term tracking in a large region. Another disadvantage of ARKit is, before tracking in real space, ARKit asks the user to direct a smartphone configured with a camera and an ARKit application at a set of specified featured signs in the real space. These signs such as a wall-mounted room number plate must be pre-recorded in the corresponding model in order to synchronize the real world and the model. This process can be difficult for a visually impaired user to perform. Google's ARCore offers similar features as ARKit, and suffers the same limitations. Neither of them was designed for visually impaired people.

In brief overview, embodiments of the present inventive concepts include systems and methods for performing multimodal assistive indoor navigation operations using a smartphone or other mobile electronic device for any users, especially for assisting people with special needs, such as the blind and visually impaired (BVI) individuals who require voice, vibration and/or visual interaction. In some embodiments, the systems and methods integrate multimodal data, including floor plans, beacons, Wi-Fi/cellular data connectivity, 2D/3D visual models, and user preferences, but not limited thereto. Instead of storing a single model of a large spatial structure such as a building, the present inventive concepts divide a large region into multiple small regions, referred to as local regions, and model these regions separately. There may be overlap space between neighboring regions. However, the coordinate system of each model is aligned with the floor plan of the area in a 2D global coordinate system. The modeler can use the modeling application to set the region's boundaries with a beacon installed in each region before or after modeling the region. Accordingly, BLE beacons or the like can be installed at the region at any time so long as the beacon identifier matches the corresponding region label or identifier. Other methods for determining a user's location in a region may equally apply. For example, a QR code can be generated by the system for each region for the user to scan or Wi-Fi-based geolocation may be used by performing a Wi-Fi scan.

As shown in FIG. 1, some embodiments include an indoor navigation system 100 comprising a plurality of subsystems 10, 20, 30 that execute a hybrid modeling method to perform real-time turn-by-turn navigation assistance using accurate real-time localization over large spaces without requiring an expensive infrastructure. In some embodiments, the subsystems include a web server 22, a hybrid modeling subsystem 10, and a real-time navigation module 30.

The hybrid modeling module 10 performs a method comprising region segmentation, interactive destination annotations, and automatic landmark determination, which involves the incorporation of Wi-Fi/cellular download speed maps, floor plans, beacon maps, and visual models. The hybrid modeling subsystem 10 generates a hybrid model of a location, e.g., a structure such as a building. The model is hybrid because it includes other modalities in addition to a visual modality. The hybrid model is generated in portions, for example, the location subdivided into local regions or other discrete units, and organizes the data in a graph structure or the like, for example, constructed and arranged with graph elements such as nodes representing destinations and landmarks, and edges representing traversal paths between nodes.

Figure 2:
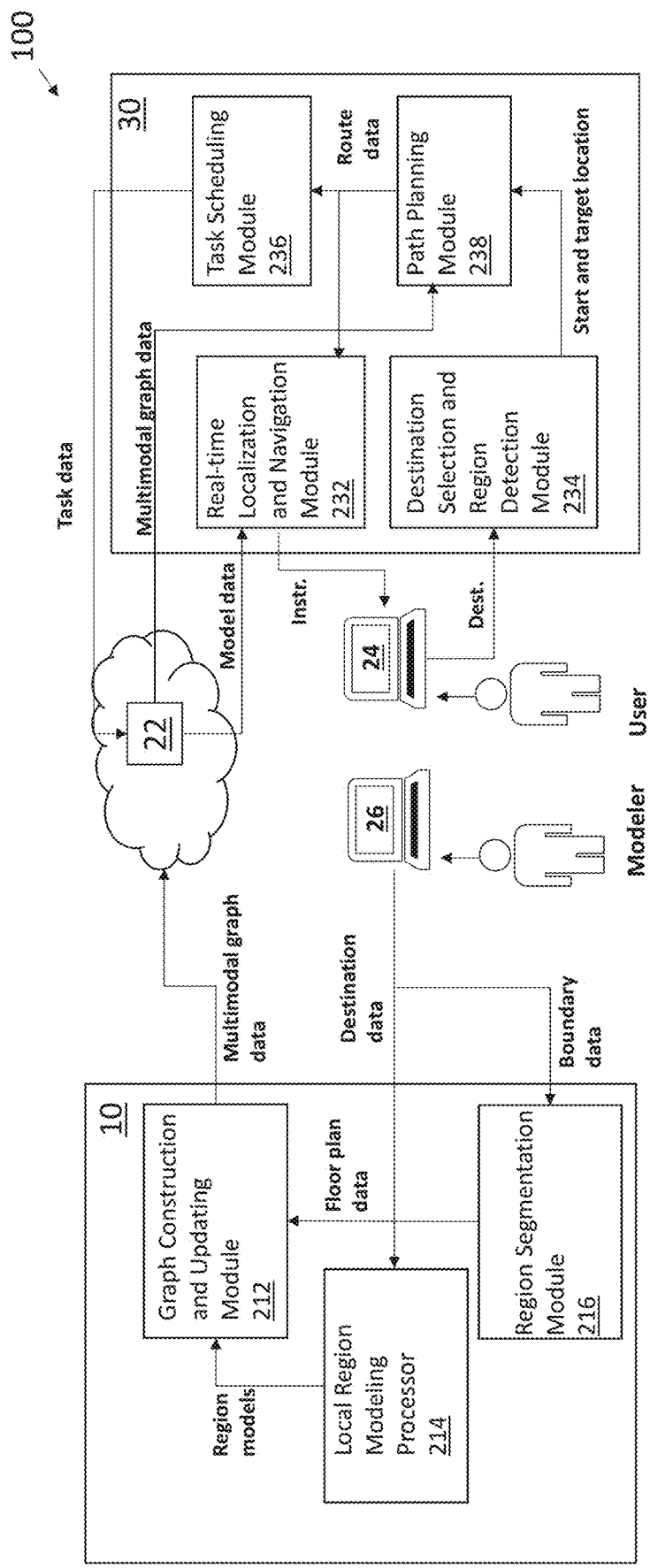
FIG. 2 is a workflow diagram of the real-time indoor navigation system of FIG. 1.
Figure 6A:
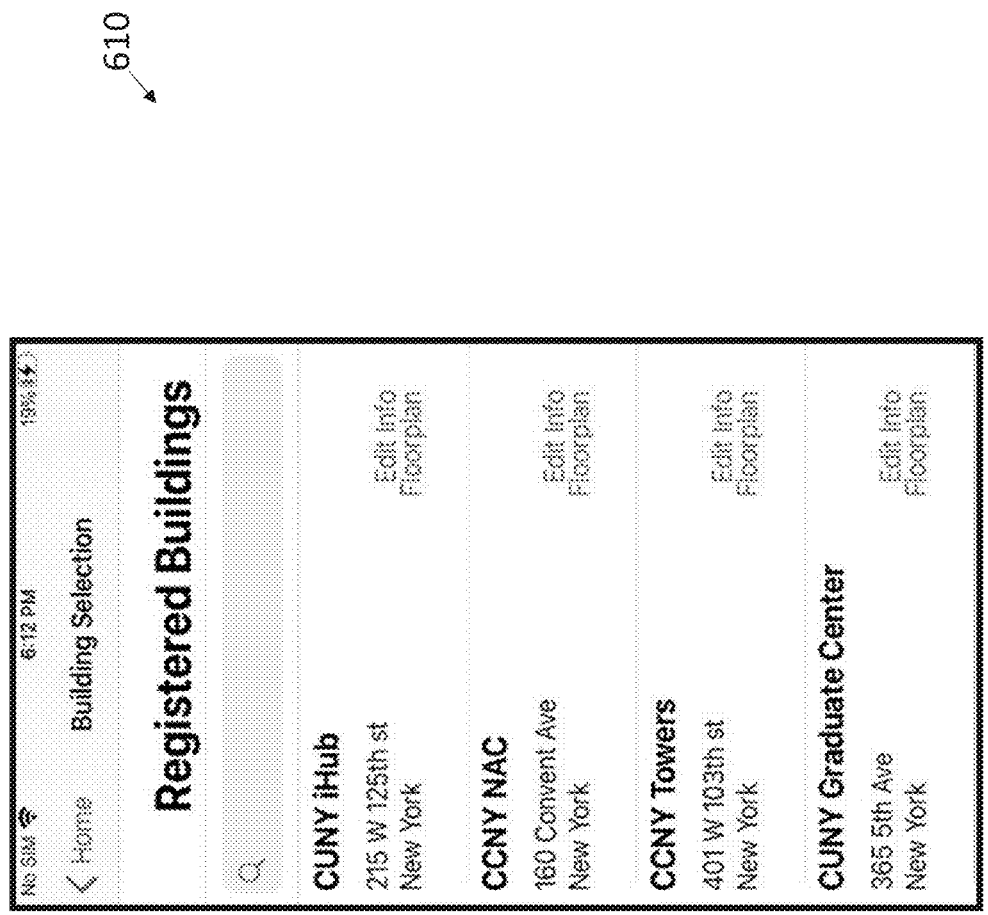
FIGS. 6A-6F are screenshots of a graphical user interface of a modeler electronic device, in accordance with some embodiments.
Figure 6B:
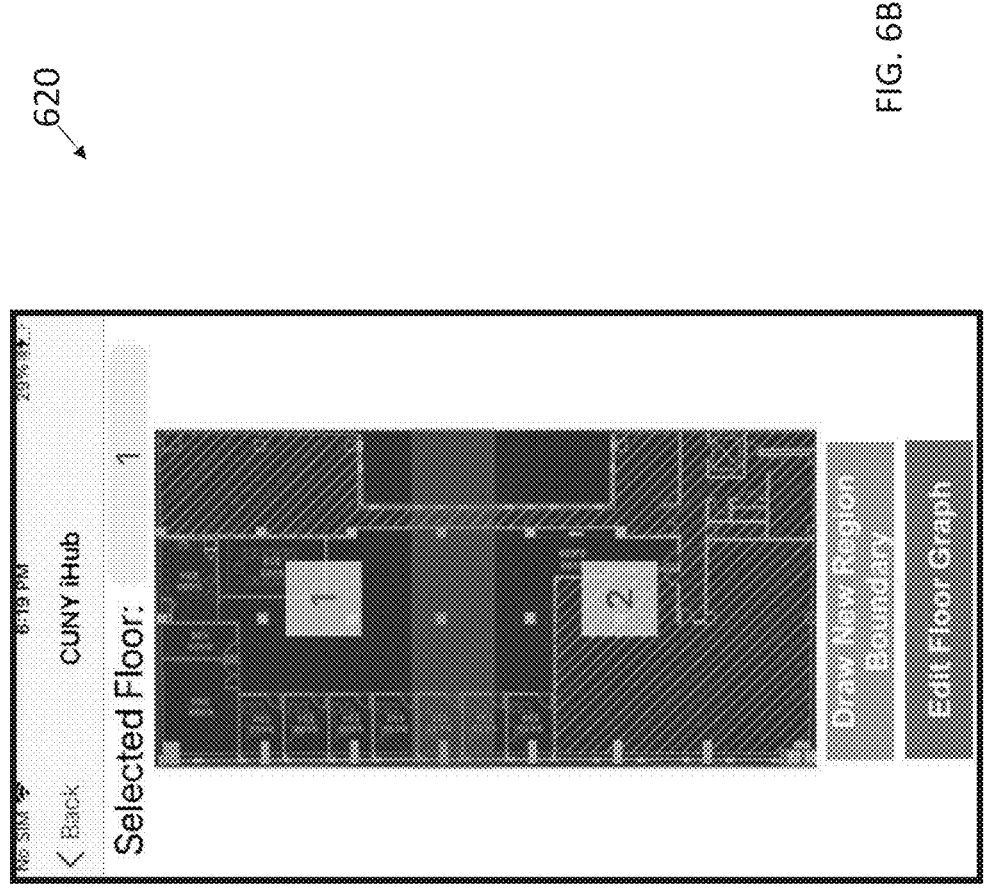
Figure 6C:
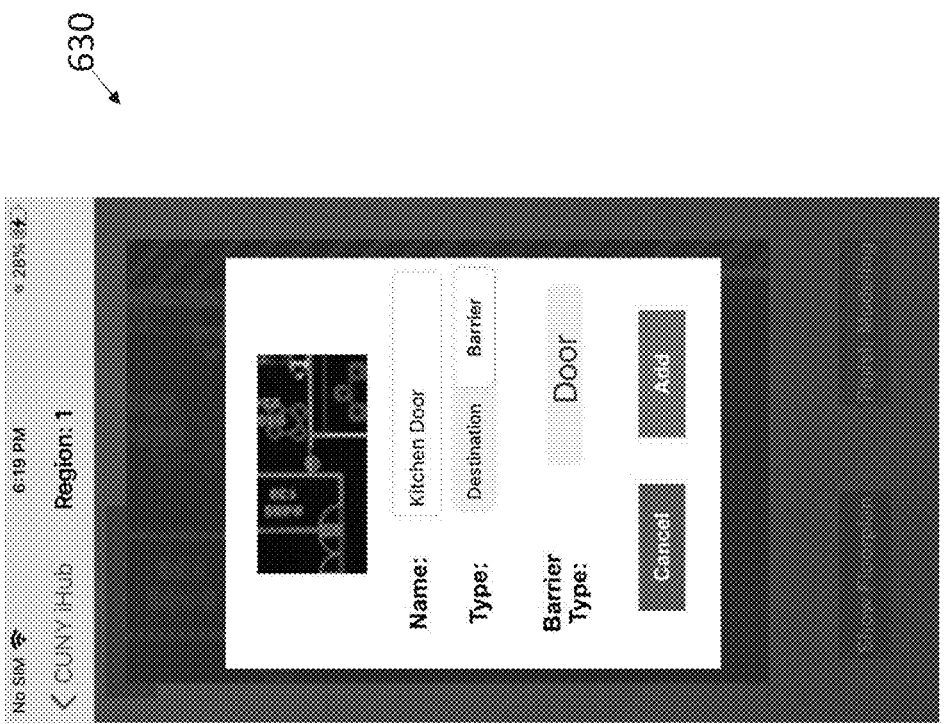

As shown in FIG. 2, the hybrid modeling subsystem 10 includes a graph construction and updating module 212, a local region modeling processor 214, and a region segmentation module 216, some or all of which may be implemented in and executed by hardware, software, or a combination thereof, for example, some or all of which can be part of a smartphone 26 or other modeler electronic devices. For example, the hybrid modeling system 10 includes one or more special-purpose computer processors that collect relevant data, such as a Wi-Fi/cellular data connectivity map, a beacon signal strength map, a 3D visual model, for example, including annotated destinations and landmarks, while a modeler in communication with the computer processors via a modeler electronic device 26 such as a smartphone walks through the building, and registers with the floorplan of the building. The modeler can upload the floorplan image from the modeler electronic device 26 in the modeling app or web interface of the online management system 20 (FIG. 4), which includes the web server 22. Modeler can identify the real-world scale of the floor plan either by directly inputting the scale or provide the real-world distance (either in meter or feet) between any two selected points from the floorplan image, for example, shown in FIG. 6F.

The graph construction and updating module 212 receives and processes region model data from the local region modeling processor 214 and floor plan data from the region segmentation module 216 to generate a multimodal graph, which in turn is stored at the web server 22 for receipt by a path planning module 238 of the navigation subsystem 30. The graph construction and updating module 212 constructs a local graph for each region model generated by the local region modeling processor 214, and the local graphs are connected for each floor, and between floors into a global map, for example, in the form of a global graph.

The local region modeling processor 214 generates the region models for output to the graph construction and updating module 212 are used to locate the user's current position in the building. The modeling process is completed on each floor with multiple local region models generated each time.

The region segmentation module 216 processes data corresponding to multiple smaller areas or regions into which a large area is divided. For example, a corridor outside a room may be divided into six regions. One beacon or related electronic sensor may be installed for sensing the environment at each region. The beacon is constructed and arranged to identify the region where the user is located so that the mobile device can identify the region model to be loaded.

In addition, an overlapping space can be added between region boundaries to avoid repeated switching models by accident when a user walks across around the region boundary. To align the 3D visual model and the floor plan of the area in a 2D coordinate system, i.e., in the model and real-world coordinate systems, respectively, the application graph construction and updating module 212 uses an affine transformation or the like to account for the location accumulating nature of the local 3D visual model. The match coordinate computations may be performed in the web server 22, or the modeling application of the mobile device.

During operation of the hybrid modeling subsystem 10, a user with the modeler electronic device 26, referred to as a "modeler," can walk around a building of interest and interactively mark destination points using a modeling interface displayed on the device 26 along with information about the destination, such as the location type, accessibility for visually impaired people, etc. While the modeler is moving around the building, the application automatically collects the location information, including the Wi-Fi/cellular signal strength and the geolocation features. All the collected information is output from the modeler's mobile electronic device 26 to the hybrid modeling subsystem 10 to model the regions of the floor. The application can integrate existed beacons or other location sensors of the corresponding region, or return proposed locations to install new beacons near the important landmarks if no sensors are available. The modeling process is completed on each floor with multiple local region models generated each time. Ideally, each region requires one beacon device or related sensor. After the modeler finishes scanning a floor, all the region models and their connections with the global map are output to the web server 22 for storage. The modeler can repeat the process for each floor until the building is completely modeled, or at least sufficiently modeled for the modeler.

In some embodiments, the modeler inputs information (including name, type, and accessibility data) to the modeler device 26 for a destination when the modeler is physically in front of the destination. This information is used for route planning. For example, stairs may often be recorded as a landmark. Although elevators have same functionality as stairs and are more accessible, the location of stairs relative to elevators needs to be recorded to offer an accessible detour for BVI users. Some salient "landmark" locations are also important for navigation and are recorded even though they maybe not refer to any accessible destinations. Examples include a fire extinguisher or a sign on the wall that both have unique visual features and are permanent on the way to destinations. Selecting destinations and salient landmarks is the only interactive part performed by the modeler.

An automatic "essential" landmarks extraction algorithm is applied to make the modeling process simpler and handier for the modeler. While the modeler 26 moves about a region of interest, such as a floor of a building, the application will automatically collect the information about intermediate landmarks (e.g., position, download speed, etc.) until the recording of the next destination. The essential landmarks extraction algorithm executed by the hybrid modeling module 10 identifies essential landmarks (e.g., a turning point) between the two destinations. If the distance between two essential landmarks is long, the algorithm will select several unessential landmarks between these two landmarks and record them as landmarks. For example, if the distance is 10 m, the system will select 3 unessential landmarks. The above process will be repeated from one destination to another until modeling is finished for a whole area. In some cases, as the modeler 26 might travel a path more than once to label, or identify, any missing destinations, there will exist closely located landmarks that consider as duplicates. Thus, after the modeler 26 finishes labeling all the destinations of the area, all the selected landmarks are checked to remove redundancies and adjust the connections between the result landmarks.

In some embodiments, the indoor navigation system 100 includes the online management system 20 (FIG. 4) constructed and arranged according to a client-server architecture, which may include a combination of the web server 22 or the like and client electronic device(s) 24 that allows the scaling of the system 100 to a large area such as a college campus with multiple buildings, a skyscraper, and so on. In some embodiments, the client-server architecture includes multiple databases hosted in the cloud where the data are stored, for example, shown in FIG. 4. The web server 22 may also operate to provide a communication channel between a client electronic device 24 and the databases. A client electronic device 24 may be a smartphone, laptop computer, or other computer having a display, hardware processor, memory storage, and one or more input/output devices. The client-server architecture allows scaling by lazy-loading the models generated by the hybrid modeling subsystem 10 according to beacon signals and/or adjacent region proximity. The adjacent region proximity is the distance between the user's current location and the closest point of an adjacent region, and the value will be adjusted based on whether a planned route existed.

Figure 4:
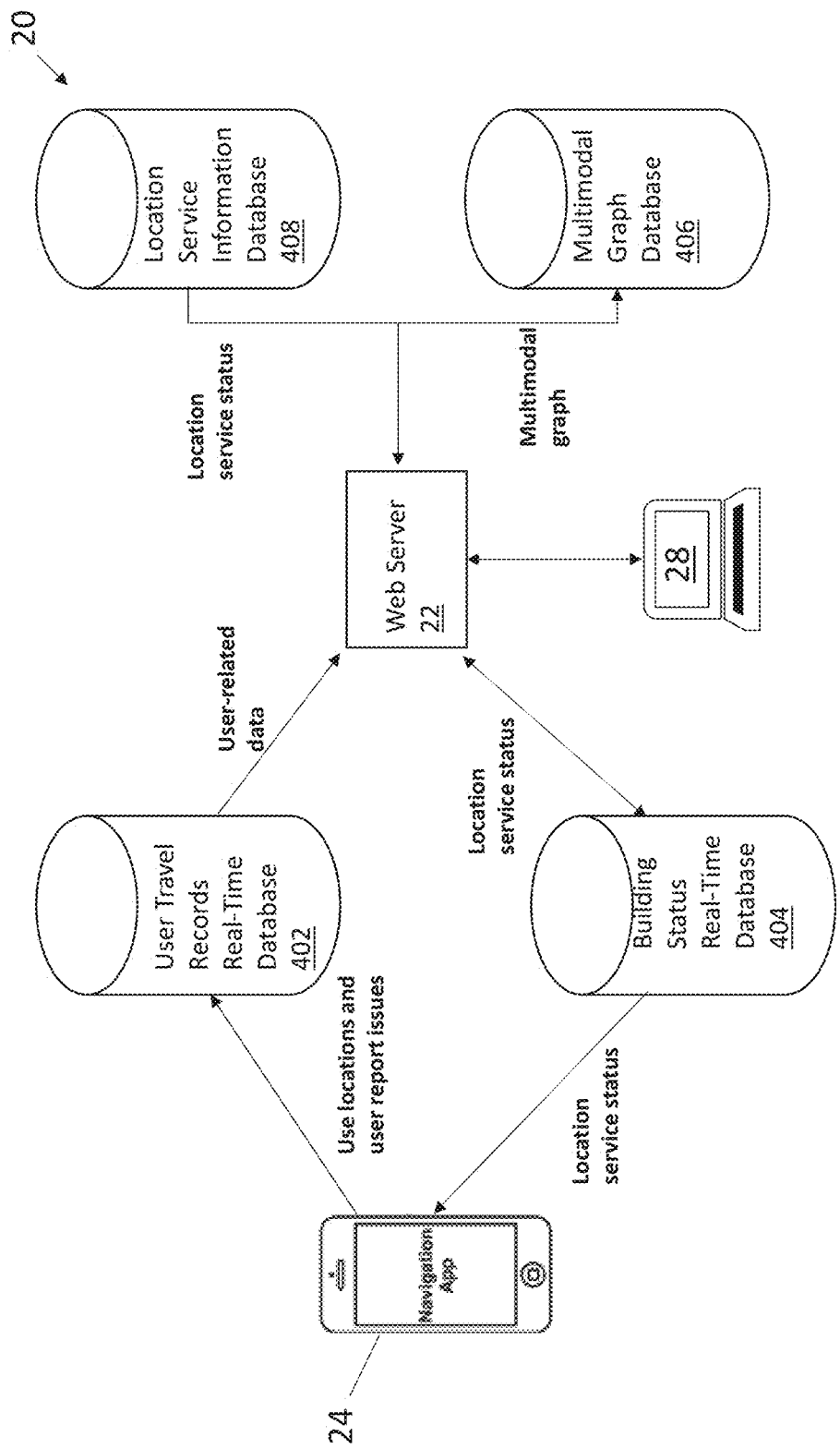
FIG. 4 is a workflow diagram of an online management system, in accordance with embodiments of the present inventive concepts.

In some embodiments, as shown in FIG. 4, the hybrid models generated by the special-purpose computer processors of the hybrid modeling subsystem 10 are saved at the web server 22, which in turn may be in a cloud computing environment and downloaded to the client electronic device(s) 24 upon request by the user, or otherwise when the stored data is requested or required. The hybrid model data may include the graph, 3D visualized model, transformation matrices, and/or other information needed for path planning and determine user's real-time location in a local region.

The web server 22 can also store a beacon strength map, connectivity map, or other configuration data that includes information on the building, which can be provided to the navigation subsystem 30 for determining a path. For example, a beacon strength map may store data regarding the identification, strength, or other information from beacons positioned at the regions identified in a floor plan or the like. For example, the corridor of a floor of a building may be divided into six regions. One beacon can be positioned for each region to determine which region the user is in. The client electronic device 24 can activate the application to receive a display that illustrates which region where the user is in by checking the strength information of the detected beacons, which allows the application to know which model to download from the web server 22. The web server 22 can include an interface to a personal computer, smartphone, or other user electronic device that permits building managers to manage the building information and track a user's real-time location without requiring computer programming skills.

In some embodiments, the mobile electronic device 24 stores and executes a computer application that provides turn-by-turn indoor navigation information for BVI and other individuals with voice, vibration and visual interaction, using the onboard sensors of the mobile electronic device 24, for example, an iPhone or an Android smartphone, while in electronic communication with the online management system 20. The mobile device application stored and executed at the device 24 can provide voice navigation for step-by-step moving directions and guided visual, audio, and/or tactile information, such as audio instructions for a blind user, pointers for a low vision or other sighted user (see for example FIG. 7B), incorporating vibration to remind the user to make the turn. The mobile device application can also auto-correct the path when users begin walking in the wrong direction. With high-accuracy position detection, adjustable paths, and easy-to-follow guidance, the system 100 allows people with BVI and people with traveling challenges to travel independently and safely indoors.

The navigation subsystem 30 includes a real-time localization and navigation module 232, a destination selection and region detection module 234, a task scheduling module 236, and a path planning module 238, some or all of which may be implemented in an executed by hardware, software, or a combination thereof.

After the visual model of a local region is downloaded to the user's smartphone 24, a visual matching module will localize the user accurately in the region by matching the camera views of the user electronic device 24 with the 2D/3D model. The visual matching module executed in the smartphone 24 can include instructions (visual on display, audio, tactile, or a combination thereof) to guide the user on how to move the smartphone device to match the downloaded visual model. The path planning module 238 executes an adaptive path planning algorithm that receives multimodal region model data from the hybrid modeling subsystem 10, which may be stored at the web server 22, and takes the visual, connectivity, real-time location status such as construction data and user preference information into account in planning a path for the user's current location to the selected destination. The task scheduling module 236 executes a scheduling algorithm to download visual models of neighboring regions from the web server 22 considering connectivity information.

For example, a planned route processed by the navigation submodule 30 may entail several overlapping regions. As described herein, different regions correspond to their respective models stored at the web server 22. While navigating, the system 100 can download the corresponding model of the region from the web server 22 to the path planning module 238 through the guidance of the task scheduling module 236 when Wi-Fi/cellular data connection is strong. However, some of the regions may not have a strong signal connection. To address this, the system 100 can download the models of the poor network connection regions in advance when the user is in regions with the excellent network connection so that the user does not need to stop and wait for downloading when entering the new region. Data on download speeds, signal strength, and the like can be detected and stored at web server 22, and used by the task scheduling module 236, described in greater detail below.

The real-time localization and navigation module 232 receives and processes 2D/3D visual modeling data, for example, ARKit models generated by the modeler 26 and stored at the web server 22 and also receives and processes route information from the path planning module 238 to generate and output real-time information and navigation instructions to the client electronic device 24. Although ARKit models are described by way of example, other 2D/3D visual modeling tools may be used to generate relevant region models.

The destination selection and region detection module 234 receives a selected destination from the client electronic device 24. A user can enter the destination as text or speech input, and may also enter path selection preferences. The destination selection and region detection module 234 can also process the user's current region determined using beacon signals or the like, i.e., from beacons located at the respective region(s) and output start and target location information to the path planning module 238 in turn generates a route that is suitable for the user according to the user preferences and the global map stored at the web server 22 and provided by the web server 22 as part of multimodal graph data to the path planning module. In some embodiments, the global map contains all the building's information and connections among various building's regions, including destinations, landmarks, etc. For navigation, the global map will be used to determine the path, while the multimodal region models are used to locate the user's current position in the building. The task scheduling module 236 can determine the downloading tasks for the regional models with consideration for the route and the WiFi/cellular strength of each region. The computer memory can store the region models required for navigation, and allow for scaling to a number of mapped interior regions.

In some embodiments, the indoor navigation system 100 includes distinct user interfaces (not shown) for navigation include visual, audio, and/or haptic displays for different targeted users. User-friendly interfaces are designed for sighted users to easily search for the destination and receive real-time information and navigation instructions from the navigation subsystem 30 in both visual marks and voice instruction. In some embodiments, voice user interfaces or the like communicate with features of the user device 24 designed for visually impaired users. Accordingly, voice instructions and warnings for obstacle detection frequency can be adjusted based on the user's level of vision loss.

Figure 7C:
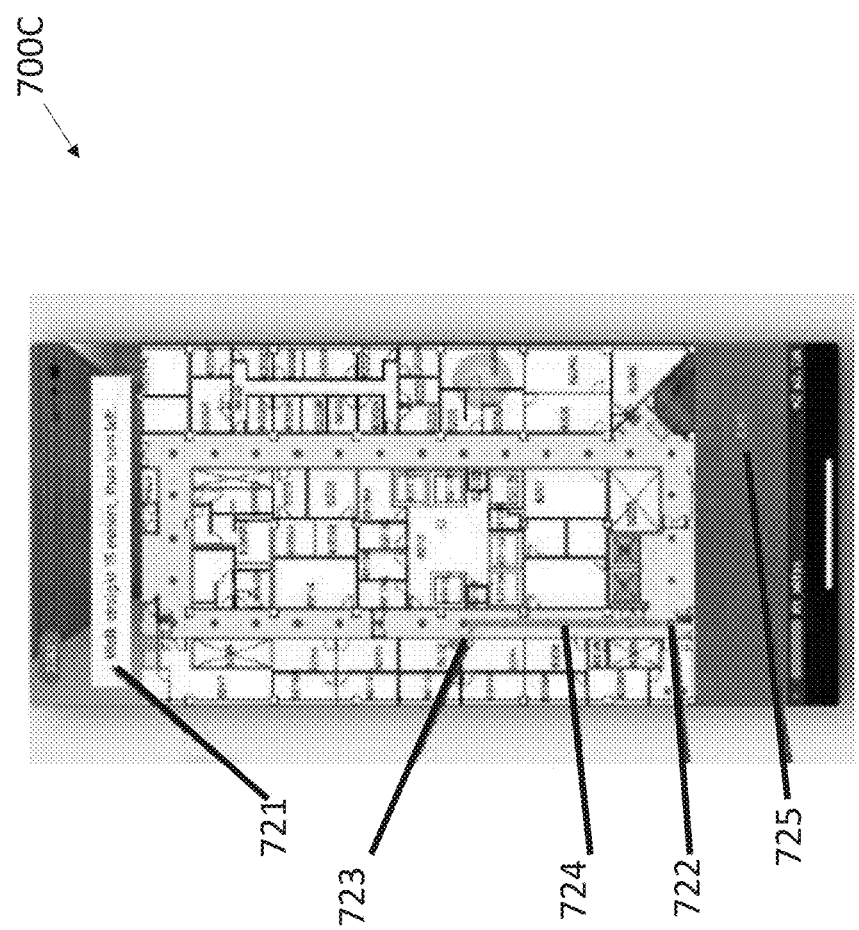

For example, as shown in FIGS. 7A-7C the graphical user interface (GUI) on the client electronic device 24 can display or otherwise communicate the user's current location, including an identity of the region of the use, by the client electronic device 24 detecting the beacon with the strongest signal strength. The application executed on the client electronic device 24 can download a corresponding model from the web server 22. Downloading models ad hoc keeps the system 100 lightweight, as it only stores in memory the region models required for navigation, and also allows for scaling to an arbitrary number of mapped interiors. With the downloaded region model, the device's camera can capture images, and processing the images to find and match pre-defined landmarks in the 3D visual model, for example, an ARKit region model. The application uses the information to align the coordinate system of the camera, the 3D visual model, and the 2D floor plan data to convert the coordinates of the user's location from the camera so that the application can subsequently ask the user the destination of navigation by synthesized voice, text, tactile, or the like.

A planned route may involve several regions of a building or other indoor location of interest for navigation. As described above, different regions correspond to their respective models and all these models have been stored in the web server 22. While navigating, the client electronic device 24 may download a corresponding model of the region where the user is in from the web server 22 via Wi-Fi or cellular data connections. However, in cases where there are poor network connections, it is preferable that the client electronic device 24 download the models of the regions with a poor network connection in advance during a time when the user is at a region with a suitable network connection for downloading data. A download speed heat map can be generated at the modeling subsystem 10.

Figure 3:
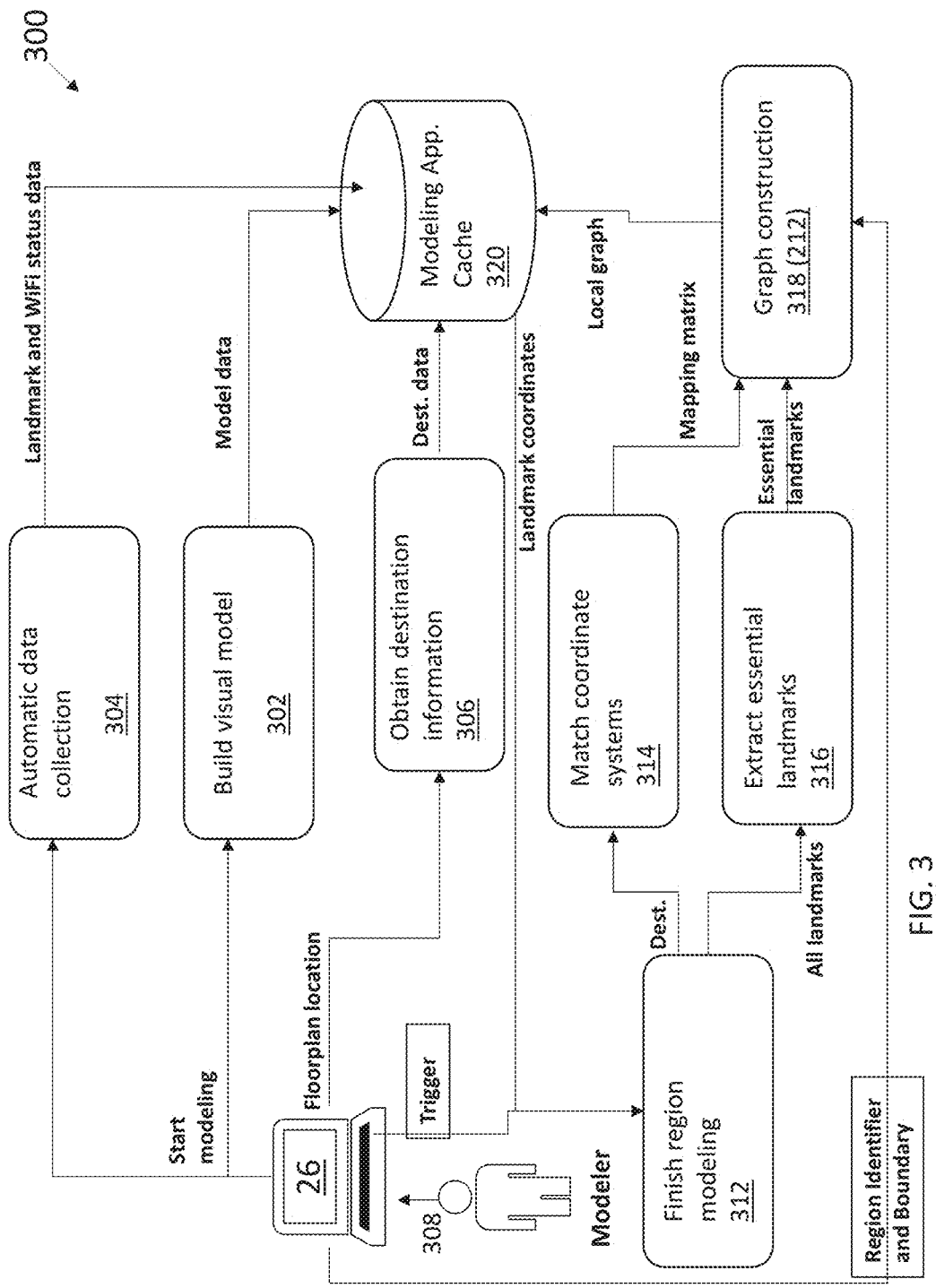
FIG. 3 is a workflow diagram of a data collection process for modeling a local region of a building, in accordance with embodiments of the present inventive concepts.

FIG. 3 is a workflow diagram of a data collection process 300 for modeling a local region of a building, in accordance with embodiments of the present inventive concepts.

When modeling a region, a spatial visual model is generated (302) while the modeler 26 scans the region for collecting feature points. For example, modeling tools such as ARKit include visual tracking and plane detection technology to create feature points, which are used to place models on the scene and to have the models anchored to their surrounding region. The feature points represent notable features detected in the camera image. Their positions in a 3D coordinate space are extrapolated as part of an image analysis process performed by the hybrid modeling subsystem 10 which are provided to the navigation subsystem 30, in some embodiments by the web server 22 storing the position data, to accurately track the device's position, orientation, and movement. The modeling application 26 can also collect (304) the 3D location data of a landmark in the model coordinate system on a predetermined basis, for example, every second, tracking the movement and location of the path of the modeler 26 during this operation. The application can also benchmark network download speed or other connectivity data, for example, every 5 seconds by computing the received data in the 5 second interval from the network adapter or the like with the strongest signal strength in each area detected by the sensors at the respective area. The process can be repeated until the modeling is completed. Each automatic landmark is assigned the most recent detected download speed or relevant connectivity feature.

The modeler 26 can input (306) the destination or key landmark information to the local region modeling processor 214 when the modeler 26 is physically at the destination by selecting the location from the floor plan displayed or other communicated from the modeler's electronic device 26. The key landmarks are the locations essential for navigation, such as stairs, elevators, and so on, and/or obstacles or congested areas that may be difficult for BVI users to follow the predetermined path to reach the desired destination.

Figure 6D:
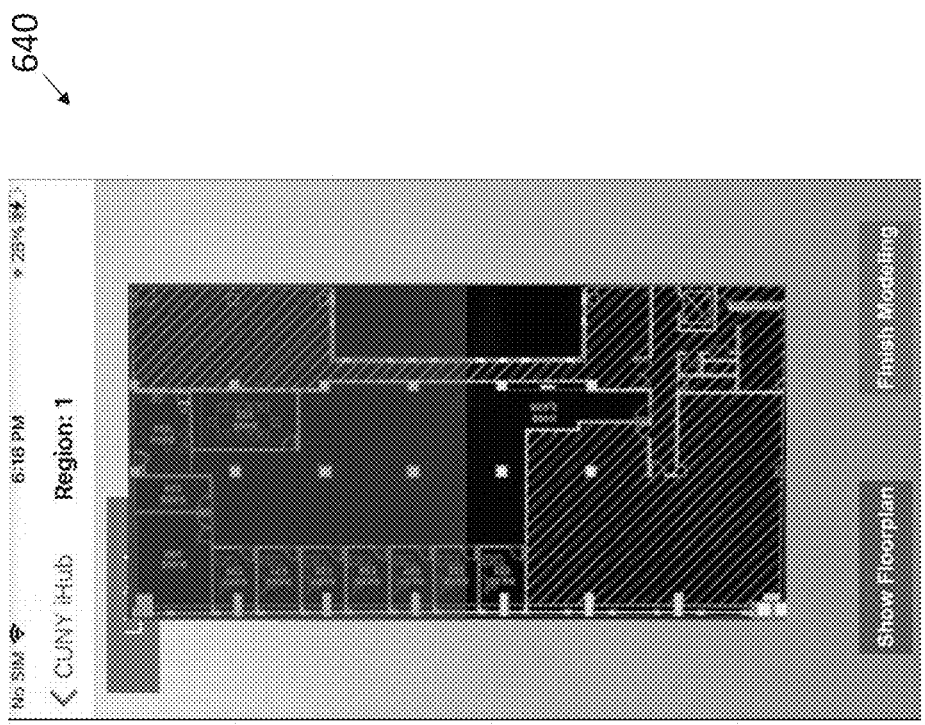

After modeler 26 denoted completed modeling the region, for example, by selecting the "Finish Modeling" button shown in FIG. 6D, the modeling application stops region data collection (312) and calculates transformation matrices that map the region visual model using the destination and key landmark coordinate pairs (314) provided in the model and the floor plan, for example, performed by the region segmentation module 216. As described above, a process for extracting essential landmarks (316) is applied to remove the unnecessary automatically collected landmarks. The landmark extraction algorithm first finds the essential landmarks, e.g., turning points, between two locations or key landmarks and incorporates additional unessential landmarks if necessary if the distance between two essential landmarks is too long. The selected landmarks are filtered to remove landmarks that are too close together to be considered distinct and to add intermediate connections between landmarks. After removing unselected intermediate landmarks, the local region graph (318) is formed with nodes, i.e., destinations and selected essential landmarks that contain identity, coordinates, Wi-Fi connectivity, and accessibility information, and connected by edges as traversable paths. A modeling application cache (320) or other data storage device can receive and store the data required for modeling a building, for example, a large multi-floor building, including the ARKit models, beacon information, 2D floor plan, connectivity information, and destination/landmark information required for a multimodal graph for use in a personalized route planning algorithm (described below). The modeling application cache (320) may be part of the mobile device for storing local graphs of one or a few modeled regions.

In some embodiments, destinations and selected intermediate landmarks output from the local region modeler processor 214 at step 316 are defined as nodes of the multimodal graph with visual, connectivity and beacon information for the route planning algorithm. The graph construction and updating module 212 executes in the graph construction step 318 and a local graph is constructed for each region model, with the nodes of the graph representing destinations and essential landmarks, which are connected by edges as traversable paths. Each local graph has an overlap area with its nearby local graphs, where the nodes in the overlap area will be automatically connected with closely located nodes. If the node is along the edge between two nodes, then it will also be connected with these two nodes. Eventually, all the local graphs are connected into a global graph (i.e., the global map) representing a floor or even a building. Instead of performing a global alignment of each whole region model (a local graph) with the corresponding parts of the floor plan, in some embodiments, the method automatically divides each local graph into triangles with vertices as the selected landmarks with corresponding 3D model coordinates and 2D floor plan coordinates. Thus, the coordinate system of each 3D visual model triangle by triangle is aligned with the floor plan of the area in a 2D global coordinate system to allow more accurate localization without drift. For example, a building is segmented into a set of regions according to a combination of boundary information on the floor plan of a region of interest from the region segmentation module 216, a corresponding ARKit spatial visual model, mapping data between the model coordinate system and the floor plan coordinate system, and the local graph corresponding to the region of interest. Each local graph includes a set of vertices or nodes and a set of edges or connections connecting to neighboring nodes in the region as well as other regions as traversable paths. Each node of the set of vertices or nodes is represented according to a combination of node identity data such as destination, key or essential landmark, node coordinates in the model and in the world, Wi-Fi/cellular data connectivity information at the node, accessibility of the node, e.g., stairs, elevators, obstacles, etc., and edges as traversable paths to and from the node. The global graph of the building includes the set of all local region graphs and connections between the regions. The global graph is updated when a new local model is generated. The hybrid modeling subsystem 10 can also identify neighboring regions by comparing the region boundaries and connect the two closest points of the neighboring regions. For example, a current modeling region can be connected with previously modeled region(s) on the same floor that have overlap area with the current region by comparing the region boundaries. The nearest nodes in the overlap area of the two regions will be connected in the global graph.

As previously described, the multimodal data collected in the hybrid modeling stage is stored at the web server 22, passing through the modeling application cache (320) on the mobile device. As described herein, the web server 22 supporting the client-server architecture is a core component for connecting the hybrid modeling subsystem 10 and navigation subsystem 30 and providing indoor navigation features in numerous locations and for multiple users. For example, the web server 22 stores all models' information received from the hybrid modeling subsystem 10 to a multimodal graph database 406, which is constructed and arranged in the cloud for storing the global graph data for multiple locations such as buildings.

As shown in FIG. 4, some embodiments of the online management system 20 include two real-time databases 402, 404 that contain user travel records and building status, respectively, a database 406 that contain the multimodal graph of the modeled buildings, and a location service information database 408 if provided by the building managers. The multimodal graph database (MMGD) 406 can combine the stored region models with multimodal data, maps, landmarks, Wi-Fi/cellular data connectivity maps, beacon maps) and a global map that contains all the building's information and connections among various building's regions (including destinations, landmarks, etc.). For navigation, the global map will be used to determine the path, while the multimodal region models are used to locate the user's current position in the building.

The web application 28 executed at a computer can exchange data through the web server 22 with the databases 402-408, for example, via API calls or the like, to operate as a management platform for building managers to manage building information, oversee real-time location service status, and user locations.

In some embodiments, the building of interest, i.e., for modeling, has its database that is constructed and arranged to store the real-time location service data (e.g., availability of a room, service updates of the transportation, promotions of the retail stores, etc.). Here, the online management system 20 will retrieve this kind of data from the location service information database (LSID) 408. In other embodiments, as shown in FIG. 4, the online management system 20 will retrieve this kind of data from our building status real-time database (BSRD) 404. The online management system 20 also retrieves the building's multimodal graph created at the hybrid modeling subsystem 10 from the multimodal graph database MMGD 406 and integrates with the location service status displays in the management platform 28. Users such as building managers can update the landmark information and service status on the management platform 28. All updates will be synchronous in the MMGD 406, BSRD 404, and the navigation application on the user's client electronic device 24. As described herein, the navigation application can include some or all components of the real-time navigation module 30 shown and described in FIG. 2. Accordingly, when the user device navigation application is described, reference may be made to features of the real-time navigation module 30. The navigation application will automatically send the user's location to the user travel records real-time database (UTRRD) 402 every minute as the user device 24 is in a navigation mode, as well as send any user report issues (e.g., issues with local infrastructures, request for help). For example, as mentioned above, the UTRRD 402 stores travel records, which can be processed for future analysis to determine a travel pattern that could be useful for the building manager to modify the building structure or other usage such as path planning for future users. In some embodiments, emergencies may arise where this be processed to notify rescuers to know the people's location. The current design is that these data are directly sent to the database from the navigation application run in the mobile device, so no subsystem needs to process that data besides directly saving it to the database. These data can be retrieved through web server 22 for a different purpose. As the UTRRD 402 receives any new data, it will trigger the management platform 28 to update the users' locations and display the user-reported issues. Building managers can validate the user-reported issues and the real-time users' locations and service status can be further used to analyze the user behavior or detect any potential risk factors.

The region segmentation modeling method described above brings a new challenge regarding a model transition. When a user walks from one region to another, the indoor navigation system 100 needs to switch from the model of the previous region to that of the new region, and it takes time to align a camera view of the new region to the new spatial visual model. Before the new model has not been matched yet in the new region, the correspondence and relationship between the coordinate system in the new model and the camera coordinate system in the global real world cannot be established.

Figure 5:
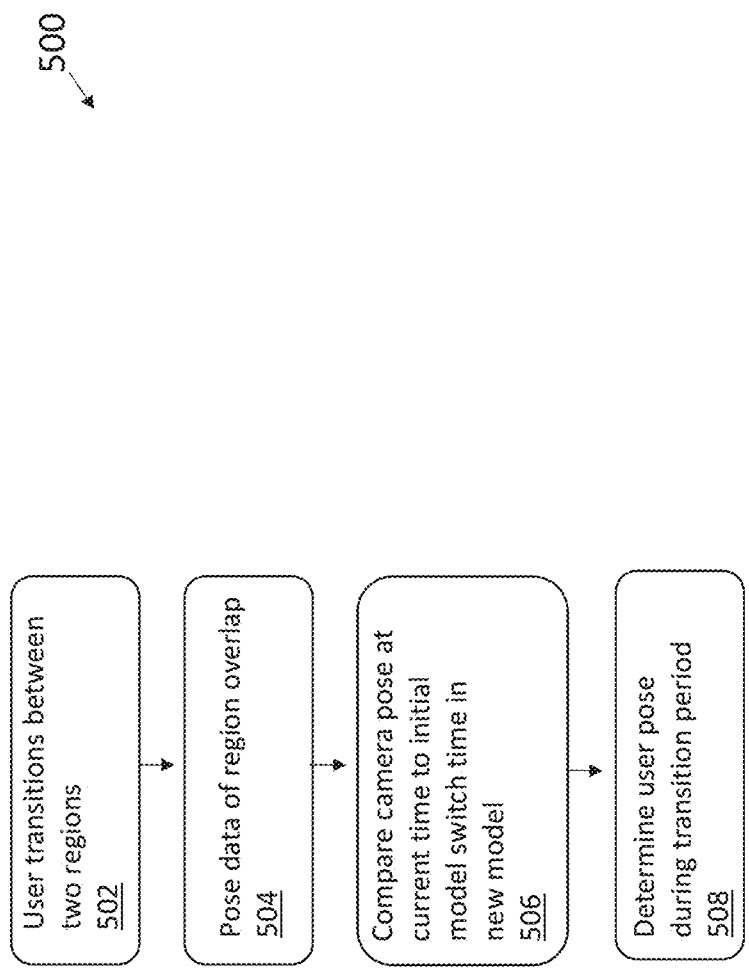
FIG. 5 is a flow diagram of a method for indoor localization that solves the model transition problem caused by region segmentation, in accordance with some embodiments.

To address the foregoing, the system 100 uses the relationship between the previous visual model and the real world (the floor plan), and the continuation of the tracking to maintain the user's localization before the first successful matching in the new region. FIG. 5 is a flow diagram of a method 500 for indoor localization that addresses and solves the abovementioned caused by region segmentation, in accordance with some embodiments.

During a transition (502) when the system 100 switches and loads the new region model at time $t_s$, the system 100 processes the previous region model-to-world transformation matrix ($M_{m_p w}$) with the camera pose relative to the previous model ($M_{cm_p}^{t_s}$) to provide the correct user's pose (504) in the overlapped area between the two regions. As the user leaves the overlapped area, the model-to-world transformation matrices cannot provide the correct user's pose if it has not found matches of its camera views to the new region model. However, in this case, the world tracking functionality of the tracking smartphone or the like still operates, which provides (506) a camera pose (M') at current time t relative to the camera pose at initial model switch time $t_s$ in the new model, instead of relative to the new visual model. The system 100 uses the following equation to determine the user's pose (508) during this transition period:

$$M^t = M_{m_p w} M_{cm_p}^{t_s} M_c^t \qquad (1)$$

In case of delays in loading the new model that causes the world tracking functionality will not work, the average of the moving distance of the last few (e.g., 10) frames can be calculated and extrapolate the user's motion linearly to estimate the user's current location. As soon as the application matches the camera view to the new region model, the application will refine the user's pose with the new model's information.

Elements of Dijkstra's algorithm (E. W. Dijkstra et al., "A note on two problems in connexion with graphs," *Numerische mathenatik*, 1(1):269-271, 1959) incorporated by reference herein can be implemented and executed by the path planning module 238 for path planning purposes, by finding the shortest path from a single source node to all other nodes in a weighted graph, whether directed or undirected. Typical Dijkstra's algorithm implementations use distances as weights. In the modified algorithm of the present inventive concepts, the system 100 not only considers the distance between two linked nodes in the graph constructed above but also other attributes, such as model download speed S, the level of BVI accessibility impediment A, real-time location accessibility R, of each node and each edge, and user preference modifiers a, b, and c:

$$\text{Weights}[v] = \text{Weights}[u] + \text{Distance}[u,v]^* \text{Cost}(u,v) + a^* A(v) + R(v) \qquad (2)$$

In equation (2), Weights[i] stores the least cumulative weight from the initial node to node i, and u and v represent connected and adjacent nodes. Assume that Weights[u] is known, such that determining Weights[v] in equation (2) requires adding the computed edge length Distance [u, v] scaled by Cost(u, v), and BVI accessibility difficulty A(v) at the node scaled by user preference modifiers a, and modified by the real-time location accessibility R(v) at node v. If node v is a regular landmark, then A(v) will be 0. The real-time location events, such as elevator maintenance or construction, will affect the value of R(v) of the associated nodes. If there is no real-time event associate with node v, then R(v) will be 0. The cost of the edge between nodes u and v in equation (2) is affected by the average download speed S between nodes u and v and the path accessibility difficulty A(u, v), and is defined as $$\text{Cost}(u,v)=1+b/S(u,v)+c*A(u,v) \quad (3)$$

For BVI users, impediments include stairs, doorways, congested areas, turning points around a node, and obstacles such as furniture or plants, but not limited thereto.

Referring again to the task scheduling module 236 of FIG. 2, in some embodiments the module 236 executes an algorithm that integrates a download speed heat map with the adaptive path planning algorithm executed by the path planning module 238. Since the system 100 can obtain the network connection of each region according to the download speed heat map, the system 100 can do the download of models adaptively. For example, if the network speed is sufficient in the current region, the system 100 will download all the models of other regions involved in the planned route for the user and those regions with poor network connection have priorities. However, if the network is too slow to download the current region model to a local storage device and the model has not been pre-downloaded, then the system 100 will generate a message that is output to the user device 24 to ask the user to stop and wait until the download is completed in order to avoid reducing the accuracy of localization. Before the user enters a new region, the task scheduling module 236 will check if the new region model is in local storage, if not, it will not switch the model until the download is completed. Nevertheless, the system 100 can still continue to provide positioning information in the vicinity of the new region by using the information from the previous model and the current model's world tracking functionality to predict user's motion. When user enters a new region, the system 100 will use the tracking results provided by the visual tracking functionality to check if new region matches with the current path from the planned route. If these two results don't match, then the user might have seriously deviated from the planned route. In this case, the system 100 will first obtain the new region through the beacon system, then download and align the corresponding model, before rerouting to the destination.

The hybrid modeling subsystem 10 with 2D & 3D visual models, connectivity maps, and landmark information will be useful not only for indoor navigation, but be useful for facility management and maintenance. For example, using the connectivity maps, the facility owners can optimize the use of the space depending on user's need in Wi-Fi and cellular data. This can also be useful to upgrade the cyber-infrastructure support for the facility. The 2D/3D and semantic data (destinations and landmarks) would be also useful for renovation and design analysis of buildings. A hybrid model can also be used for virtual tours such as for educational, training and entertainment purposes.

FIGS. 6A-6F are screenshots of a graphical user interface (GUI) of a modeler electronic device, in accordance with some embodiments.

Figure 6E:
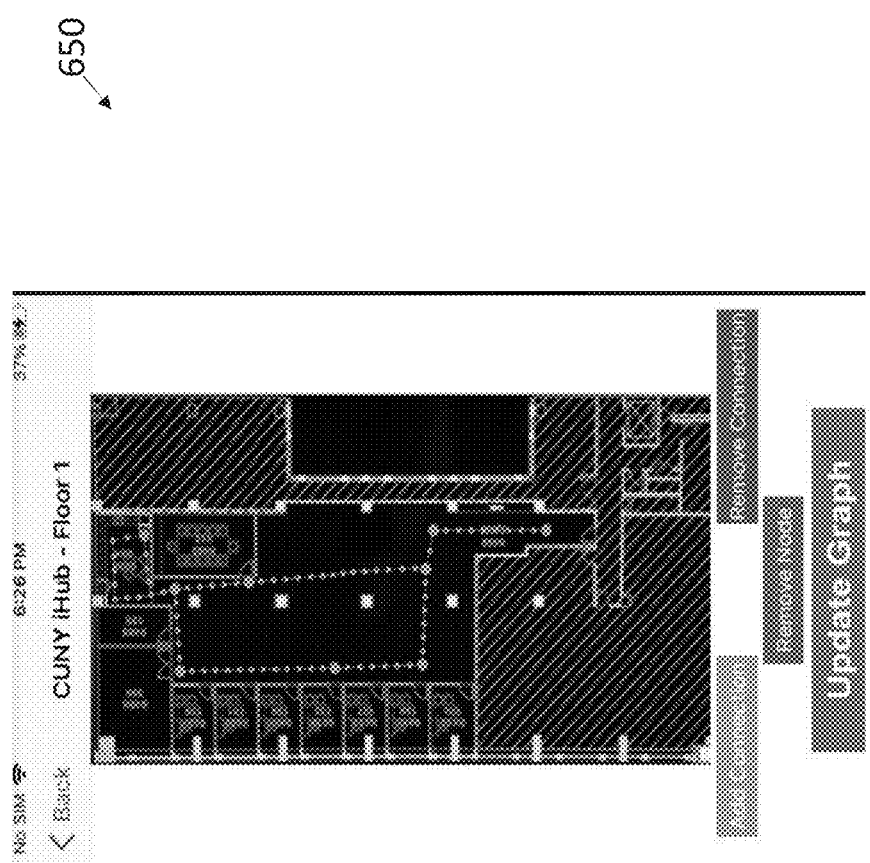
Figure 6F:
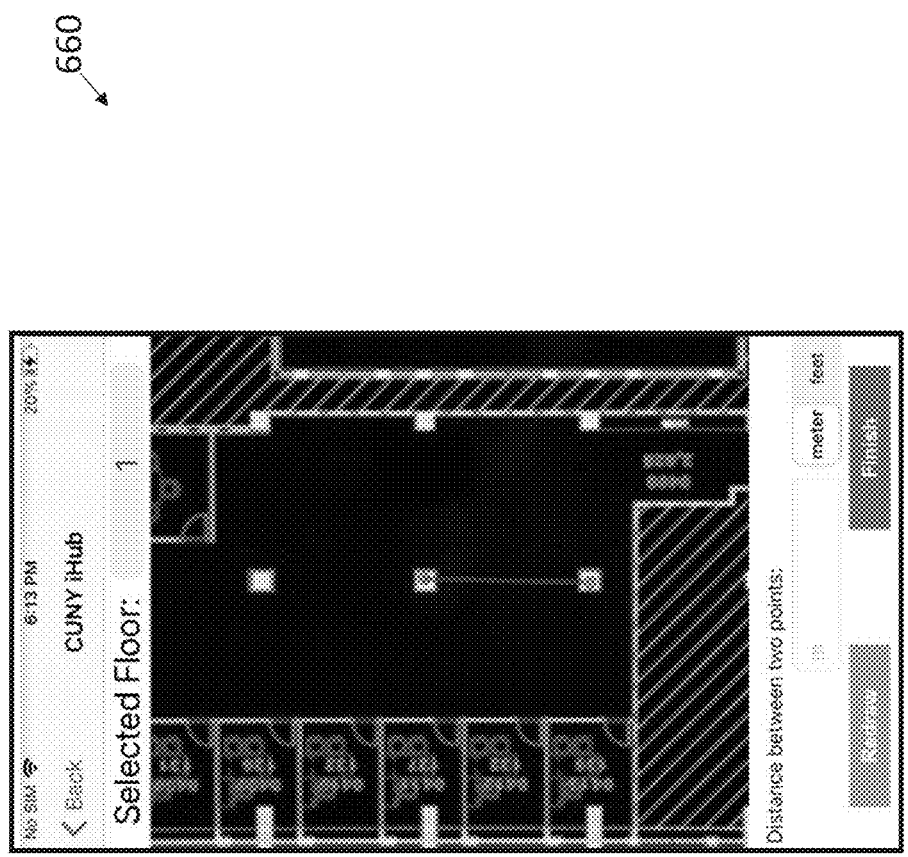

FIG. 6A is a screenshot view 610 of the listing of registered buildings that a modeler can select from. When registering a new building, building information such as the building name, number of floors, address and floor plans are input. Although the building information is shown as being entered to the modeling device 26, it can alternatively be entered through the online management system 20. The selected building permits the modeler 26 to divide an area, for example, a floor of the selected building, into local regions and set the boundary for each region, for example, shown in the screenshot 620 of FIG. 6B. The modeler 26 can walk around each pre-defined location region to scan the spatial data and record destinations and key landmarks, and can enter landmarks, barriers, and so forth as shown in the screenshot 630 of FIG. 6C, along with location identities and accessibility information. While the modeler 26 is scanning the region, the application automatically collects information such as Wi-Fi/cellular strength and geolocation features. After the modeler 26 scans the region and collected data, the region graph is constructed and saved at the web server 22. As shown in the screenshot 640 of FIG. 6D, the modeling process of the region is highlighted, and a user can select whether the modeling process is completed. As shown in FIG. 6E, the application 650 displays the floor plan after modeling, allowing the modeler 26 to adjust any pre-defined destinations and landmarks interactively, building associations between the floor plan and the local visual models. As shown in the screenshot 660 of FIG. 6F, the floorplan scale can be measured, and any two points can be selected to enter a distance between them.

FIGS. 7A-7C are screenshots of a graphical user interface of a user electronic device 24 illustrating a navigation operation performed by the system 100, in either an exploration mode (without a destination selected) or a navigation mode (when a destination is selected), in accordance with some embodiments. In particular, FIG. 7A illustrates the user device GUI 24 displaying an interface with a full screen floor plan map in a free move map mode selection FIG. 7B illustrates the user device GUI 24 displaying an interface of the live camera view with augmented signs and a map insect. The views shown in FIGS. 7A and 7B are available regardless of whether a destination is selected. When a destination is selected, the full screen map mode of FIG. 7A and the insect screen map mode of FIG. 7B can be referred to as a navigation mode. When a destination is not selected, the modes of FIGS. 7A and 7B can be referred to as an exploration mode. FIG. 7C illustrates the user device GUI 24 displaying an interface in a route planning in the real-time navigation mode. In some embodiments, the user interface displays of FIGS. 7A-7C are produced by a route planning algorithm weighted by user preference and hazard potential, with consideration of the Wi-Fi/cellular download speed along a proposed path.

During user navigation, the application on the user's smartphone 24 provides the indoor navigation for sighted users and BVI users, and the different user interfaces are designed to increase the system's accessibility and user-friendliness. When the user opens the application in any of the modeled buildings, the user's initial or current region will be determined using the beacon signals. A route is planned based on user selected preferences, i.e., the path planning module 238. A model download request is sent to the web server 22 based on the planned route and Wi-Fi/cellular strength signals of each region, i.e., the task scheduling module 236. Using speech or text input, the application executed at the user electronic device 24, e.g., smartphone, can assist users to locate their desired destination along with their path selection preferences. The system can then obtain the real-time location status and plan a suitable route for the user through the global map through the real-time localization and navigation module 232.

The model download scheduler 236 can determine the downloading tasks for the regional models with consideration for the route and the Wi-Fi/cellular strength of each region.

When a user opens the application for the first time, the application destination selection and region detection module 234 gets to know which region the user is in, by simply detected the beacon with the strongest signal strength, and asks the user for the destination of navigation in a synthesized voice. Then the application can download a corresponding model from the web server 22. With the downloaded region model, the camera inside the user device 24 begins capturing images. Once a new image is captured, it is processed to find and match pre-defined landmarks in the 3D visual model. Then the application uses this information with the corresponding region model-to-world transformation matrix to align the coordinate systems of the camera, the 3D visual model and then the real-world floor plan so that it can convert the coordinates of the user's location from the camera to the world.

When a visually impaired user enters a new place, BLE beacons will be used to put the user in a small local region, and the system 100 will audibly ask the user to scan the surroundings slowly for localization guide the user to find a landmark pre-defined in the local region model. First, instead of using beacons with either complicated trilateration or fingerprinting method in our previous work to achieve an accuracy of a few meters, we will only install beacons or use existing beacon systems already installed to pinpoint the region (typically within a 20×20-m$^2$ region). Then, the procedure will ask the user to tilt the phone up or down a certain degree to ensure the phone remains upright, then will ask the user to keep this position and move the phone around slowly to detect landmarks. We can obtain the tilt information through the visual tracking and matching function on the user device 24. If landmark detection was successful, the method will obtain the current position of the user by an algorithm based on this landmark. If unsuccessful after two periods (one period is seven seconds, and the value can be set), the system 100 will ask the user to turn left and the process will restart. If the user turns a circle (i.e., after three left turns or six periods) and a landmark has not yet been detected, the method will ask the user to move to another place to start the above process again.

Voice guidance is very useful for blind users when they are walking in an unfamiliar place. To make sure these users get navigation information, the system 100 will repeat navigation instruction every 2 meters by default and user can adjust the frequency of navigation instruction. Turn left or turn right is key information for navigation instruction. The system 100 will notify users to prepare to turn and walk slowly at 1 meter before the turn. The voice and vibration remind the user when it is time to turn and to stop the turn. The system 100 will guide users to make the correct turning angle before giving the next instruction. When the user is close to the destination, the system 100 will tell the user the specific distance to the destination until the user is directly in front of it. At this point, the navigation ends, and the free move context is restored.

After a user is localized, i.e., guided by the device camera until a landmark at a location of interest is established, the application of the mobile device 24 can transition to a visual user interface 700A in a map mode 701 shown in FIG. 7A, which includes a current position 702 of the user device 24. Information such as landmarks 703, or obstacles, destination, crowds, doors, stairs, and so on can be displayed on the map. AR assets 704 of the key landmarks will also be displayed on the live view. In a navigation test shown in FIG. 7B, a real-time camera view 711 of the current location shown in the insect screen map view 712 with a portion of the map 701 shown in FIG. 7A, including the current position 702 and a destination 705 predetermined by the user. Insect screen map view 712 can be interchangeable in the exploration mode and navigation mode with respect to the full screen view 701 of FIG. 7A. Arrows 713 or other animated objects can be displayed on the live view 711 to guide the user visually, for example, 3 steps forward, left turn, etc. The footer 714 can include a drop-down menu destination selection, which when selected can transition the application to the route planning view 700C shown in FIG. 7C. Here, displayed is a turn-by-turn navigation field 721, a start position 722, a destination position 723, a rendering of a planned route 724, and an exit navigation button 725. The navigation field 721 can display information about one or two steps ahead of the current position.

For BVI users, the user device 24 can include an audio-tactile interface. When a blind user enters a new location, the application can be configured to automatically ask the user to scan the surroundings for localization and to guide the user to find a landmark pre-defined in the model. Navigation information can be provided via audio and/or tactile devices of the user device 24.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. An integrated method for modeling a building and navigating a user using a multimodal interface on a smart device, the method comprising:
   constructing and using a hybrid model of a location, the hybrid model comprising (1) a floor plan for each floor in the location, (2) at least one landmark at the location, and (3) Wi-Fi/cellular signal strengths throughout the location, wherein the floor plan for each floor is subdivided into at least a first region and a second region with an overlapping region that covers a portion of both the first region and the second region, including:
   dividing a 2D floor plan of the location into the overlapping regions;
   traversing, by a user, a first traversable path in a region of the building along a first distance while the user carries the smart device, the smart device sensing the first distance and orientation and build a 3D region model;
   stopping and identifying a predetermined destination, and wherein during modeling, the method further comprises:
   collecting path information automatically at every time period by the smart device, the path information comprising (1) 3D location of landmarks and (2) Wi-Fi/cellular data connectivity determining essential landmarks from all collected landmarks using a 1 landmarks extraction algorithm;
   aligning the 3D region model with the 2D floor plan using a piecewise alignment method; wherein the piecewise alignment method comprises:
   dividing the graph into triangles with at least three essential landmarks using the user-identified landmarks and Delaunay triangulation method;
   estimating the mapping matrix between the 2D floor plan and the 3D region model for each triangle area;

obtaining the automatically collected essential landmarks' 2D floor plan locations using the estimated mapping matrix of the corresponding triangle;

connecting the landmarks in the local region graphs into a global graph of the building;

storing the 3D region model as soon as the user confirming finish modeling the region, to the online management system;

the method further comprising:

uploading the hybrid model to a web service;

downloading the hybrid model from the web service to a smart device, and wherein navigating the user comprises;

selecting a destination from the at least one landmark of the hybrid model;

determining a starting location of the smart device;

plotting a path from the starting location to the destination using the hybrid model; and guiding the user of the smart device to the destination in real-time.

2. The method of claim 1, wherein the path is plotted using real-time location accessibility data.

3. The method of claim 1, wherein the path is plotted using user preference data that is specific to the user.

4. The method of claim 1, wherein the path is plotted using multimodal information.

5. The method as recited in claim 1, wherein the landmarks extraction algorithm comprises:

identifying essential landmarks;

removing the unessential landmarks;

adding intermediate landmarks between essential landmarks that with a distance greater than distance threshold;

checking and replacing the redundant landmarks; and adjusting the connections between the result landmarks.

6. The integrated method of claim 1, wherein during modeling wherein a coordinate system of the 30 region model is aligned with the 20 floor plan of the location in a global coordinate system.

7. The integrated method of claim 1, further comprising:

generating a model of each of the first region and the second region; and processing region model data from a local region modeling processor to generate a local multimodal graph for each model.

8. The integrated method of claim 1, further comprising:

segmenting the location into the first and second regions according to a combination of boundary information on the floor plan.

9. The integrated method of claim 1, further comprising: providing turn-by-turn indoor navigation information in the form of voice, vibration and/or visual interaction.

10. The integrated method of claim 1, wherein the model includes a hybrid model comprising a local region of the floor plan, at least one landmark at the local region, and a wireless fidelity (Wi-Fi) or cellular signal strength at the local region.

11. The integrated method of claim 1, wherein the hybrid model is generated in according to the location subdivided into the local regions and constructed and arranged with graph elements representing destinations and landmarks, and edges representing traversal paths between graph elements.

12. An integrated method for modeling a building and navigating a user using a multimodal interface on a smart device, the method comprising:

constructing and using a hybrid model of a location, the hybrid model comprising (1) a floor plan for each floor in the location, (2) at least oen landmark at the location, and (3) Wi-Fi/cellular signal strengths throughout the location, wherein the floor plan for each floor is subdivided into at least a first region and a second region with an overlapping region that covers a portion of both the first region and the second region, including:

dividing a 2D floor plan of the location into the overlapping regions;

traversing, by a user, a first traversable path in a region of the building along a first distance while the user carries the smart device, the smart device sensing the first distance and orientation and build a 3D region model;

stopping and identifying a predetermined destination, and wherein during modeling, the method further comprises:

collecting path information automatically at every time period by the smart device, the path information comprising (1) 3D location of landmarks and (2) Wi-Fi/cellular data connectivity determining essential landmarks from all collected landmarks using a landmarks extraction algorithm;

aligning the 3D region model with the 2D floor plan using a piecewise alignment method;

storing the 3D region model as soon as the user confirming finish modeling the region, to the online management system, the method further comprising:

uploading the hybrid model to a web service;

downloading the hybrid model from the web service to a smart device, and wherein navigating the user comprises:

selecting a destination from at least one landmark of the hybrid model;

determining a starting location of the smart device;

plotting a path from the starting location to the destination using the hybrid model; and guiding the user of the smart device to the destination in real-time, wherein a navigation subsystem performs steps comprising:

identify the region user located using corresponding method, such as Bluetooth beacon information, Wi-Fi signal strength, QR code scanning;

scheduling the download tasks for the 3D region models the models using the model download scheduler planning a traversable path using a personalized path planning method;

updating the user's pose through tracking and matching by the smart device during navigation;

calculating the average of the moving distance of the last few frames and extrapolating the user's motion linearly to estimate the user's current location if is delays in loading the new model;

utilizing the previous region model camera pose and model-to-world transformation matrix with the tracking function of the smart device to estimate the user's pose before the match of the camera views to the new region model is established; and refining the user's pose as soon as the match of the camera views to the new region model is established.

13. The integrated method of claim 12, wherein during modeling wherein a coordinate system of the 30 region model is aligned with the 20 floor plan of the location in a global coordinate system.

14. The integrated method of claim 12, further comprising:
- generating a model of each of the first region and the second region; and
- processing region model data from a local region modeling processor to generate a local multimodal graph for each model.

15. The integrated method of claim 12, further comprising:
- segmenting the location into the first and second regions according to a combination of boundary information on the floor plan.

16. The integrated method of claim 12, further comprising: providing turn-by-turn indoor navigation information in the form of voice, vibration and/or visual interaction.

17. The integrated method of claim 12, wherein the model includes a hybrid model comprising a local region of the floor plan, at least one landmark at the local region, and a wireless fidelity (Wi-Fi) or cellular signal strength at the local region.

18. The integrated method of claim 12, wherein the hybrid model is generated in according to the location subdivided into the local regions and constructed and arranged with graph elements representing destinations and landmarks, and edges representing traversal paths between graph elements.

* * * * *

UNITED STATES PATENT AND TRADEMARK OFFICE
CERTIFICATE OF CORRECTION

PATENT NO. : 11,785,430 B2
APPLICATION NO. : 17/399457
DATED : October 10, 2023
INVENTOR(S) : Zhigang Zhu et al.

It is certified that error appears in the above-identified patent and that said Letters Patent is hereby corrected as shown below:

In the Claims

Column 20, Line 3, that portion of Claim 12 reading "in the location,(2) at least oen landmark at the location," should read as "in the location,(2) at least one landmark at the location,".

Signed and Sealed this
Fifth Day of December, 2023

Katherine Kelly Vidal
*Director of the United States Patent and Trademark Office*